(12) United States Patent
Ryberg et al.

(10) Patent No.: US 7,648,149 B2
(45) Date of Patent: Jan. 19, 2010

(54) DAMPED REAR SUSPENSION TRACK BAR

(75) Inventors: Daniel R. Ryberg, Lake Orion, MI (US); Hamid Mir, Rochester Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 432 days.

(21) Appl. No.: 11/460,844

(22) Filed: Jul. 28, 2006

(65) Prior Publication Data

US 2008/0023929 A1    Jan. 31, 2008

(51) Int. Cl.
*B60G 21/055* (2006.01)

(52) U.S. Cl. .............................................. 280/124.106

(58) Field of Classification Search ................ 29/897.2; 280/124.106, 124.107, 124.152, 124.166
See application file for complete search history.

(56) References Cited

U.S. PATENT DOCUMENTS

| | | | | |
|---|---|---|---|---|
| 2,621,920 A * | 12/1952 | Hogsten et al. | ................ | 267/44 |
| 3,131,576 A * | 5/1964 | Schilberg | ..................... | 74/588 |
| 3,643,320 A * | 2/1972 | Werner | ......................... | 29/469 |
| 4,019,301 A * | 4/1977 | Fox | ............................... | 52/834 |
| 4,238,540 A * | 12/1980 | Yates et al. | ................ | 428/35.9 |
| 5,397,112 A * | 3/1995 | Roth et al. | ............. | 267/140.12 |
| 5,456,486 A * | 10/1995 | Lee | ..................... | 280/124.107 |
| 5,885,688 A * | 3/1999 | McLaughlin | ................. | 428/131 |
| 6,096,403 A * | 8/2000 | Wycech | ....................... | 428/122 |
| 6,199,940 B1 * | 3/2001 | Hopton et al. | ......... | 296/187.02 |
| 6,357,768 B1 * | 3/2002 | Chan et al. | ............. | 280/124.106 |
| 6,668,457 B1 * | 12/2003 | Czaplicki | .................... | 29/897.1 |
| 6,869,091 B1 * | 3/2005 | Anderson et al. | ..... | 280/124.164 |
| 7,181,846 B2 * | 2/2007 | Wagner et al. | ............. | 29/897.2 |
| 7,192,034 B2 * | 3/2007 | Radke et al. | ............. | 280/6.159 |
| 7,300,064 B2 * | 11/2007 | Johnson et al. | ........ | 280/124.106 |
| 2006/0090343 A1 * | 5/2006 | Riley et al. | ................. | 29/897.2 |

FOREIGN PATENT DOCUMENTS

JP    05104923 A  *  4/1993

OTHER PUBLICATIONS

SAE Technical Paper Series 950585; "Development of a Multi-Link Beam Rear Suspension for Front-Wheel-Drive Cars;" Yoichiro Kato, Yoshiro Tateishi, and Naoto Ogawa of Nissan Motor Co., Ltd.; cover + pp. 227-236; 1995.*

* cited by examiner

*Primary Examiner*—Paul N Dickson
*Assistant Examiner*—Laura Freedman
(74) *Attorney, Agent, or Firm*—Ralph E. Smith

(57) ABSTRACT

A track bar for a rear suspension of a vehicle has a first tubular member, an energy dissipating member wrapped around the first tubular member, and a second tubular member encompassing the energy dissipating member. Together, the tubular members and energy dissipating member dampen vibration transmitted through the track bar to lessen the audible vibrations that rear the interior of a vehicle cabin.

9 Claims, 4 Drawing Sheets

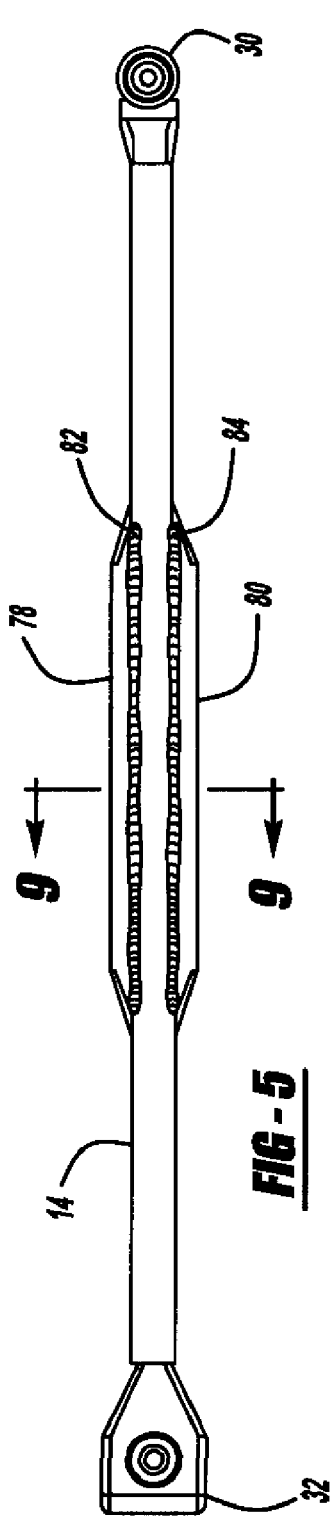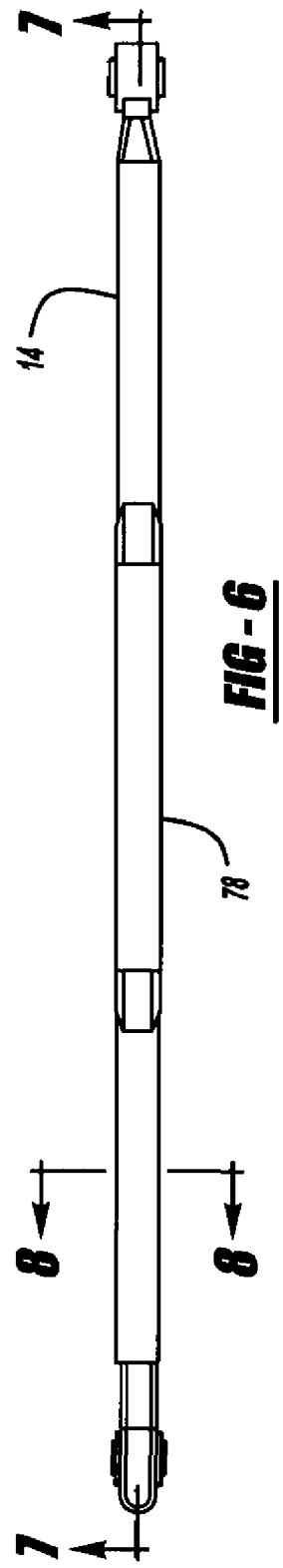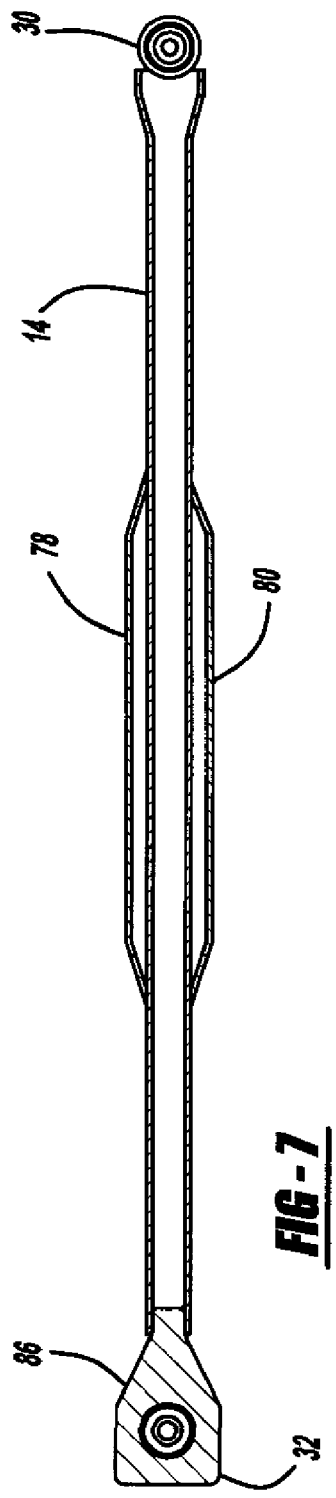

DAMPED REAR SUSPENSION TRACK BAR

FIELD OF THE INVENTION

The present invention relates to a rear suspension track bar for a vehicle.

BACKGROUND OF THE INVENTION

Modern vehicles, such as sport utility vehicles, may employ various suspension components that not only support the weight of a vehicle and its contents, but also contribute to various aspects of comfort of the passengers seated inside the vehicle. One such component is a rear suspension track bar. Although generally satisfactory for their given application, such track bars have not been without their share of limitations. For instance, existing track bars are not sufficiently effective at damping mid-frequency gear whine (400-600 Hz range) generated in the rear differential or carrier gear set and heard in a passenger compartment. This is due primarily to the materials used in fabrication of existing track bars which may be limited in mass and sophistication and thus transmit higher than desired vibrations. Finally, existing track bars may lack the desired level of stiffness to optimally dampen vibrations that traverse through the track bar during vehicle operation.

What is needed then is a device that does not suffer from the above limitations. This, in turn, will provide a device that dampens mid-range frequency (400-600 Hz) vibrations in the track bar. Furthermore, a device will be provided that increases the mass of the track bar, and finally, a device will be provided that both stiffens and adds central mass to the track bar and thereby dampens vibrations in the track bar.

SUMMARY OF THE INVENTION

In accordance with the present teachings of the invention, a vibration-damping track bar for a rear axle of a rear wheel drive vehicle has a vibration absorbing, viscoelastic, constrained layer damping material sandwiched between and bonded to a first tubular member and a second tubular member. When subjected to shear due to bending, the energy dissipating constrained layer damping material dampens audible frequencies that travel through the track bar.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a side view of a rear suspension track bar according to the present invention;

FIG. 6 is a top view of a rear suspension track bar according to the present invention;

FIG. 7 is a cross-sectional view of FIG. 5 depicting a rear suspension track bar according to the present invention;

DETAILED DESCRIPTION OF THE PREFERRED EMBODIMENTS

The following description of the preferred embodiments is merely exemplary in nature and is in no way intended to limit the invention, its application, or uses.

Figure 1:
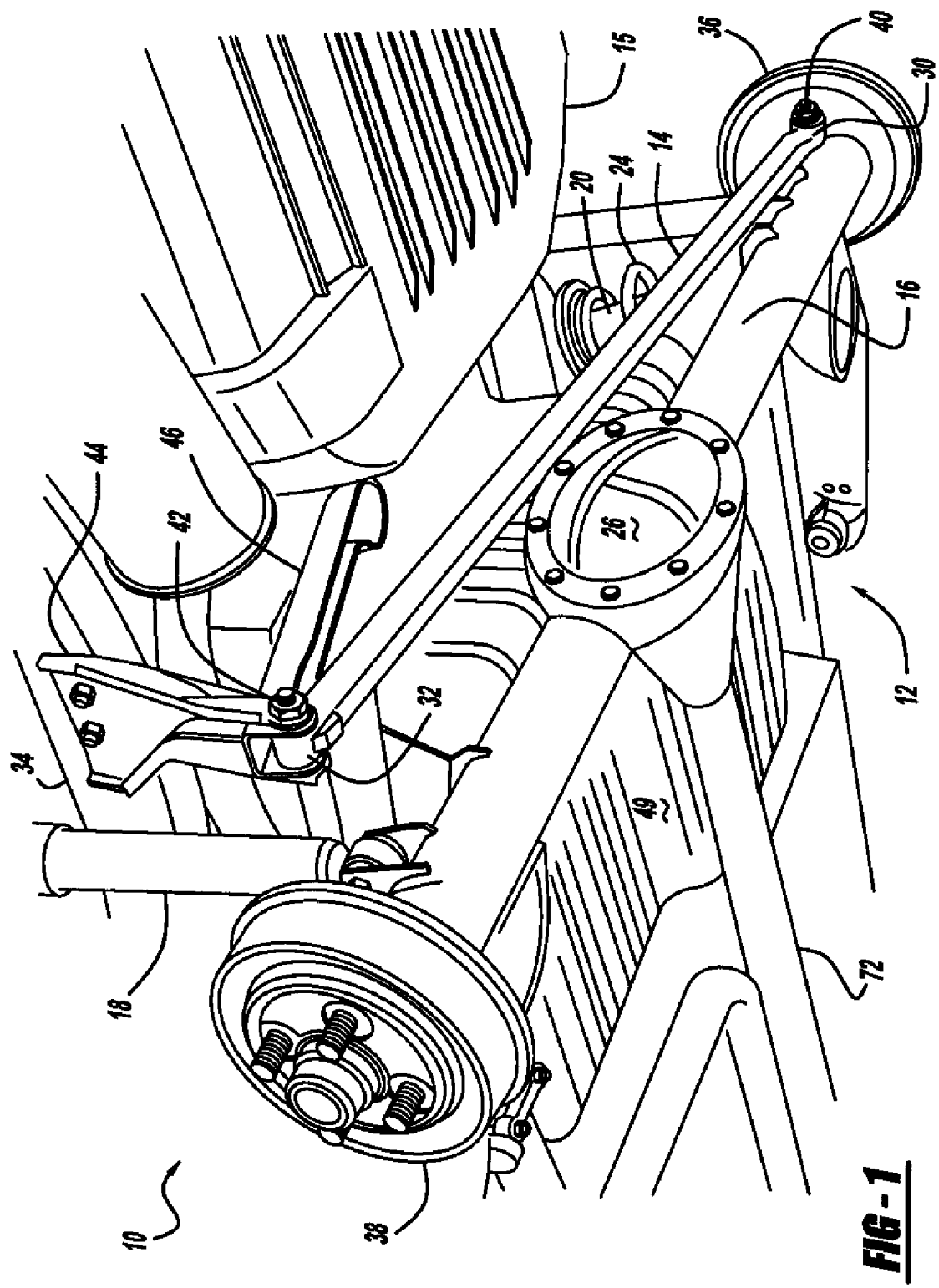
FIG. 1 is a perspective view of a rear suspension of a vehicle depicting a track bar according to the present invention.

FIG. 1 is a perspective view of a vehicle 10 with a rear suspension 12 and a track bar 14, located just in front of a fuel tank 15 according to the teachings of the invention. Before elaborating on the details of the present teachings, an overview of the components in a rear suspension will be provided. Continuing with FIG. 1, the rear suspension 12 is an assemblage of parts consisting of, but not limited to, a rear axle 16, a left shock absorber 18 and a right shock absorber 20. Additionally, each shock absorber 18, 20 is accompanied by a spring, such as a left spring (not shown) and a right spring 24; such springs may either be coil springs or leaf springs. While the shock absorbers 18, 20 and their accompanying springs are capable of absorbing dynamic loads in the vertical direction, the rear track bar 14 limits the effects of forces and loads on the rear suspension 12 by preventing lateral motion due to transverse loads. While the rear track bar 14 prevents or limits transverse loads from effecting the rear suspension 12, the rear track bar 14 of the present teachings also prevents vibrations from the rear carrier 26 from propagating through the track bar 14 and into the vehicle's cabin 28 (FIG. 2), located above the floor 48 (FIG. 2) of the vehicle 10.

Figures 2, 3, 4:
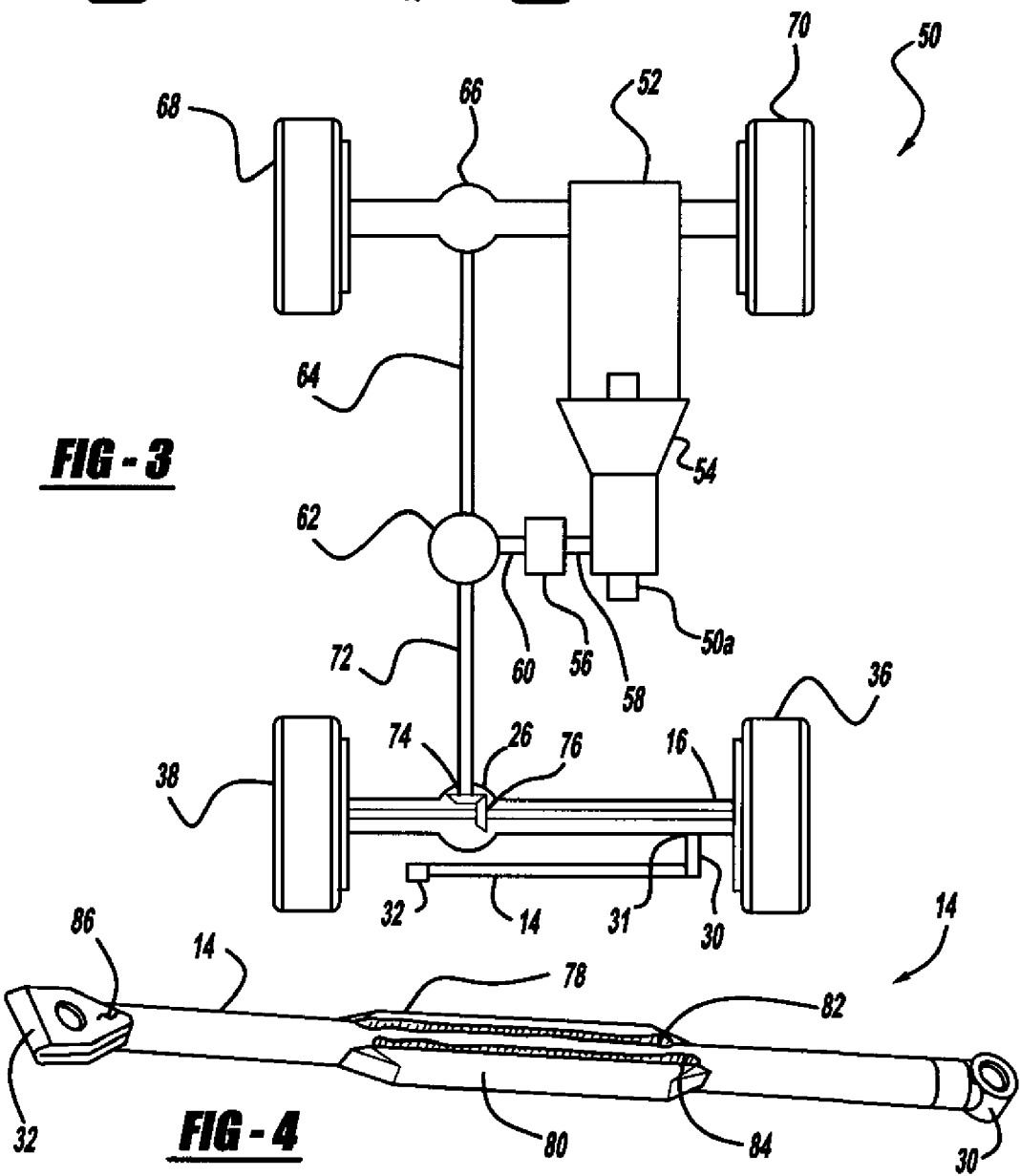
FIG. 2 is a rear view of a vehicle depicting a rear axle and the mounting location of a rear track bar in a second arrangement according to the present invention.
FIG. 3 is a top view of a drivetrain of a four wheel drive vehicle depicting a location of a track bar according to the present invention.
FIG. 4 is a perspective view of a rear suspension track bar according to the present invention.

Continuing with a more detailed explanation of how vibrations may be transmitted into the cabin 28 of the vehicle 10, the differences between FIGS. 1 and 2 will first be noted. FIG. 1 depicts a rear track bar 14 with its right bar end 30 mounted to the axle 16 of the vehicle and its left bar end 32 mounted to the frame 34 of a vehicle. The right bar end 30 is known as the active end of the track bar 14 while the left bar end 32 is known as the passive end of the track bar 14. The mounting of the right bar end 30 is adjacent the right rear wheel 36 and the right bar end 30 may be attached to the axle 16 by using a bolt 40 or other fastener, with or without a mounting bracket. FIG. 3 depicts a mounting bracket 31 as an example of such a configuration. In FIG. 1, the left bar end 32 is depicted attached to the frame 34 adjacent the left rear wheel 38 using brackets such as a vertical bracket 44 and a lateral bracket 46. The track bar 14 may attach to the brackets using a bolt 42 or other fastener to secure the left bar end 32 to the frame 34; however, depending upon the configuration and spatial constraints surrounding the rear suspension of the vehicle, such brackets 44, 46 may or may not be necessary. That is, track bar 14 may attach directly to the frame 34.

Regarding the configuration of FIG. 2, the track bar 14 has its right bar end 30 mounted to the axle 16 close or proximate to the right rear wheel 36 as in FIGS. 1 and 3. FIG. 2 is different from FIG. 1 in that the track bar 14 left bar end 32 of FIG. 2 is mounted to the underside of the body, such as the floor 48 of the cabin 28, instead of the frame 34. However, a mounting bracket 33 may be used to secure the left bar end 32 to the floor 48 of the body.

FIG. 3 is a top view of a chassis 50 and drivetrain of a four wheel drive vehicle depicting a location of a track bar 14 according to the present teachings. Additionally, FIG. 3 more clearly depicts some of the sources of vibration that are ultimately transmitted into the cabin 28 through propagation in the driveline components. More specifically, the chassis 50 of FIG. 3 is equipped with four-wheel-drive and depicts an engine 52 coupled to an automatic or manual transmission 54. Rotational output from the transmission 54 may be input into a transfer case 56 via a first shaft 58, and then via a second shaft 60 into a center differential 62. From the center differential 62, power is supplied to a front carrier 66 by a front driveshaft 64. The front carrier 66 then divides power to a left front wheel 68 and a right front wheel 70.

Continuing with FIG. 3, the center differential 62 also outputs power to a rear driveshaft 72 that inputs rotational power into the rear carrier 26, which houses a pinion gear 74 and a ring gear 76. It is through all of the above front and rear driveline components, depicted initially in FIGS. 1-3, that contribute to the audible gear whine (vibration) transmitted into the rear axle 16 primarily through the pinion gear 74 and ring gear 76. For the purposes of the discussion of the present teachings, axle 16 may mean either the actual axle itself that receives rotational power from the ring gear 76 or the axle housing. Because the audible gear whine is transmitted into the rear axle 16, it is also transmitted into the track bar 14. Once in the track bar 14 at the axel bracket 31, the vibrations travel through the length of the track bar 14 and into the floor 48 and body 49 (FIG. 1) of the vehicle 10, where the audible components of the vibration may be heard by front and rear seat occupants of the vehicle. However, the track bar 14 of the present teachings dampens the vibrations that enter the track bar 14 and lessen the audible and non-audible portions of the vibrations to the seat occupants. With reference to FIGS. 1-10, further present teachings will now be presented.

FIG. 4 depicts a track bar 14 according to the present teachings in which a first damping mass 78 and a second damping mass 80 have been added to a center portion of the track bar 14. The masses 78, 80 may be welded in accordance with welds 82 and 84, respectively, which may be continuous bead welds, stitch welds, or similar types of welds in order to permanently secure the masses 78, 80 to the bar 14. Although the masses 78, 80 dampen vibrations propagating through the bar 14 due to their mass alone, the welding of the damping masses 78, 80 to the track bar 14 also stiffens the track bar 14, which further prevents bending in the track bar 14 upon longitudinal loading of the bar. Therefore, the masses 78, 80 contribute to damping of any vibrations generated in the rear carrier 26 or culminating in the rear carrier 26 from the balance of the driveline components mentioned above.

FIG. 4 also depicts a left end mass 86 on the track bar 14 at the left end 32. The left end mass 86 is the last point on the track bar 14 where vibration may be damped before the vibrations propagate into the frame 34 and vehicle body 49. Similarly to the masses 78, 80, the end mass 86 dampens vibrations propagating through the track bar 14.

Figure 8:
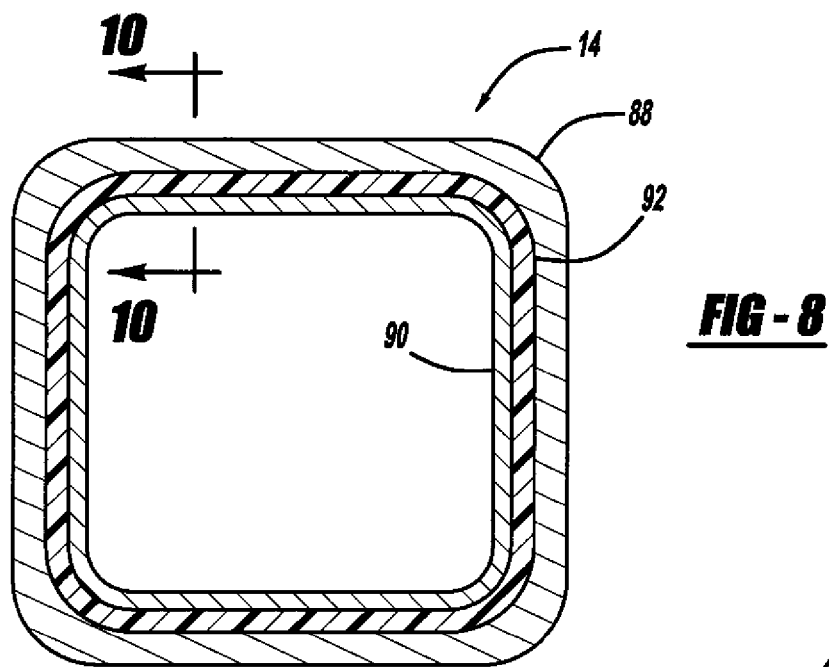
FIG. 8 is a cross-sectional view of the location 8-8 of FIG. 6 of the track bar according to the present invention.
Figure 9:
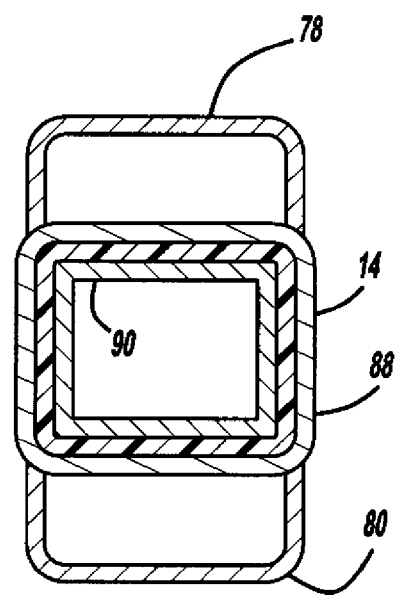
FIG. 9 is a cross-sectional view of the centralized location 9-9 of FIG. 5 of the track bar according to the present invention.
Figure 10:
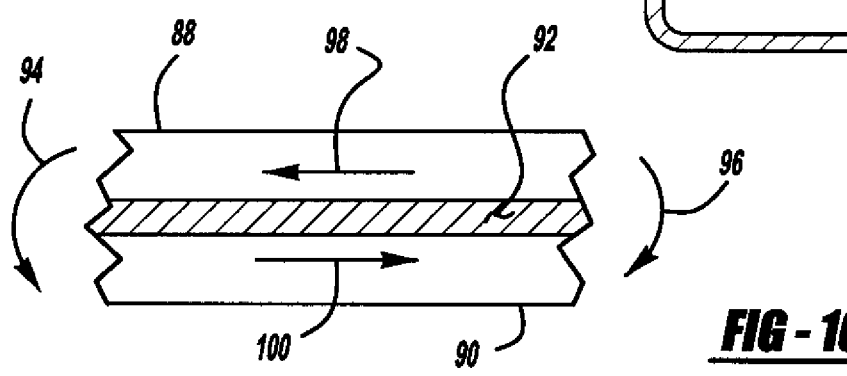
FIG. 10 is a cross-sectional view depicting the shear strain that section 10-10 of the track bar of FIG. 8 experiences when the track bar is subjected to bending during vibration propagation.

Various views of the track bar 14 according to the present teachings will be presented before more specific features and advantages are explained. FIG. 5 is a side view of the rear suspension track bar 14 and is how the track bar 14 may look if viewed from the rear of the vehicle 10, as in FIG. 2. FIG. 6 is a top view of the rear suspension track bar 14 and is how the track bar 14 may look if viewed from above the chassis 50, as in FIG. 3. FIG. 7 is a cross-sectional view of FIG. 6 depicting the rear suspension track bar according to the teachings. FIG. 8 is a cross-sectional view of a location proximate either of the ends of the track bar 14, as depicted in FIG. 6. FIG. 9 is a cross-sectional view of a centralized location of the track bar 14 as depicted in FIG. 5. FIG. 10 is a cross-sectional view of a longitudinal wall section of the track bar 14 according to the section depicted in FIG. 8. More specifically, FIG. 10 depicts shear strain in accordance with arrows 98, 100 that a wall section may experience when the track bar 14 is subjected to longitudinal compression and bending by vibration propagating through its tubular shape.

FIG. 9 depicts a top or first C-channel section 78 and a second or bottom C-channel section 80. The C-channels 78, 80 may be welded to the outer tubular member 88 with a continuous bead weld or a stitch weld; such welds 82, 84 are depicted in FIGS. 4 and 5. The C-channels 78, 80 provide the advantage of additional mass to the track bar 14, which helps to reduce the transmission of vibrations through the track bar 14 from the pinion and ring gears 74, 76, and of providing greater stiffness to the center portion of the bar to resist bending upon application of longitudinal loading in the bar 14, which is transverse loading on the rear suspension. Vibrations passing through the track bar 14 may be audible or inaudible and pass into another vehicle part and then become audible, and finally propagate into the vehicle cabin 28 where the vibration can be heard by a passenger.

Details of how vibrations are damped will now be explained. The damping technique employed in the present teachings is constrained layer damping ("CLD"). The damping material 92 in the present teachings may be a viscoelastic material and used in a "sandwich" arrangement with other materials. The damping material 92 may be one of the heat expandable, sound deadening, constrained layer damping materials available from Soundwich Corporation, such as their material designated as HH-55. Such damping materials may also be used on vehicle firewalls and floors to dampen energy (noise) that may be heard by a vehicle passenger. In a three layer CLD situation, a base layer such as the outer tubular member 88 in FIG. 8, a constrained layer such as the inner tubular member 90, and a viscoelastic damping material layer 92, are bonded together. In the present teachings, the outer tubular member 88 is of the same material as the inner tubular member 90, and may be a low or medium carbon steel.

Continuing, for a constrained layer damping construction, as depicted in the present teachings, the damping material 92 must be bonded to both the base layer 88 and constrained layer 90 to achieve the most effective shear damping (i.e. when the base layer boundary 88 is in tension, the constrained layer boundary 90 is in compression and visa versa). FIG. 10 depicts a situation in which the outer tubular member 88 is in tension and the inner tubular member 90 is in compression. Such a situation occurs when a vehicle in which the track bar 14 is installed travels down a road, around turns, etc. During such vehicular maneuvers the track bar 14 is cyclically placed into compression as a single component, and then into cyclical bending by the vibrations which results in the shear strain situation depicted in FIG. 10. In FIG. 10, according to arrows 94 and 96, the top wall, which is outer tubular member 88 of FIG. 8, is placed into tension while the lower wall, which is inner tubular member 90, is placed into compression. When this tension and compression situation occurs, shear damping occurs within the damping layer 92 which damps vibrations propagating in the outer tubular member 88 and inner tubular member 90.

Noise and vibration damping in a material such as a steel track bar was historically difficult because steel possesses little or no internal damping capability and its resonant behavior makes it an effective sound radiator or transmitter. However, by adding a viscoelastic layer 92 in accordance with the present teachings, vibrational energy is dissipated, dampened and absorbed as a result of extension and compression of the viscoelastic layer 92 under flexural and shear stress from movement, indicated by arrows 98, 100, of the outer tubular member 88 and inner tubular member 90, respectively. When the track bar 14 flexes during vibration propagation, shear strains develop in the damping layer and mechanical energy, e.g. vibration, is lost or damped through shear deformation of the damping layer 92 as depicted in FIG. 10. Stated another way, when, in a sandwiched construction such as depicted in FIG. 8, the track bar 14 flexes during vibration, the damping material layer 92 is forced into a shape that shears adjacent material sections. The alternating shear strain in the damping material layer 92 dissipates the vibration as low-grade frictional heat.

In order to ensure that effective damping through the viscoelastic layer 92 occurs, heat bonding may be used to bond the viscoelastic layer between the outer tubular member 88 and inner tubular member 90. Heat bonding creates a consistent bond of the damping material layer 92 to the members 88, 90 along the entire length of the members 88, 90, and provides adequate high shear stiffness during track bar use. Without adequate high shear stiffness at the bonding interface of the damping material layer 92 and the outer and inner tubular members 88, 90, a reduction of effectiveness may be noticed. More specifically, as an example, if an adhesive is used instead of heat bonding, the adhesive may have a low, less desired, shear stiffness and thus, shear strains in the adhesive may reduce the strains in the damping layer, thus reducing its damping effectiveness. Nonetheless adhesives or other fastening methods may be used to connect the damping layer to the tubular members.

Bonding of the viscoelastic damping material 92 to the outer tubular member 88 and the inner tubular member 90 in a heating process will now be described. More specifically, the damping material 92, which may be a sheet of a heat-expandable CLD material, is wrapped around the inner tubular member 90 and then together inserted into the outer tubular member 88. This structure is then heated, for example, to approximately 300 degrees Fahrenheit for 10 minutes and then cooled in still air. During the heating process, the constrained layer material expands between 200-400% between the inner tubular member 90 and outer tubular member 88 and bonds to each as depicted in FIGS. 8 and 10. The three levels of materials are only visible in cross-section and from the exterior of the track bar 14 only the outer tubular member 88 is visible, thus the damped track bar 14 has an increase in performance with no changes in outward appearance.

The outer tubular member 88 and inner tubular member 90 are used in their tubular form because as such, they have a high strength to weight ratio when compared to a solid bar. Additionally, if the members 88, 90 were solid, they would be too heavy and transmit higher quantities of vibration into the vehicle body. By making the members tubular, the track bar 14 may be made lighter in weight and receive the benefits of damping using the viscoelastic material layer 92 all awhile maintaining adequate rigidity and strength to satisfactorily perform its track bar functions.

The track bar of the present teachings successfully dampens vibrations in the mid-frequency range, or 400-600 Hz range. More specifically, in a rear wheel drive test vehicle equipped with a V-8 engine, the track bar of the teachings reduced the noise level proximate an occupant's ear from 3-10 dBA depending upon the exact location of the noise receiving microphone proximate the selected occupant's seat. The test was an $11^{th}$ order axle whine at approximately a 71 mph speed with a rear drive shaft speed of approximately 3000 RPM. The $11^{th}$ order refers to the number of gear teeth on the pinion gear within the rear carrier. Similar noise reductions were realized on vehicles equipped with V-6 engines.

Other advantages of the track bar 14 of the present teachings are that the viscoelastic material is not exposed to the elements since it is concealed within the interior or the track bar 14. As such, the damping material is not susceptible to accelerated degradation due to the environment experienced by an SUV. Finally, the track bar 14 is able to retain its neat appearance of a smooth bar without any exterior modifications about its longitudinal perimeter.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A track bar for a vehicle comprising:
   a first end adapted to be connected to a rear axle of the vehicle and a second end adapted to be connected to a body location of the vehicle;
   first and second tubular members that extend across the vehicle from the first end to the second end when the track bar is installed in the vehicle, the first tubular member disposed within the second tubular member with a vibration absorbing member sandwiched between the first and second tubular members, the vibration absorbing member extending along the lengths of the first and second tubular members across the vehicle when the track bar is installed in the vehicle;
   a first metallic C-channel; and
   a second metallic C-channel, wherein only respective ends of the first C-channel are joined by a weld to a longitudinally central top portion of the second tubular member such that a portion of the first C-channel between its ends is spaced apart from the top portion, and only respective ends of the second C-channel are joined by a weld to a longitudinally central bottom portion of the second tubular member such that a portion of the second C-channel between its ends is spaced apart from the bottom portion, and wherein the longitudinally central top and bottom portions are spaced apart from each other.

2. The track bar of claim 1, wherein the vibration absorbing member is a non-metallic material.

3. The track bar of claim 2, wherein the vibration absorbing member is a sheet material.

4. The track bar of claim 1, wherein the first tubular member, the vibration-absorbing member, and the second tubular member are concentric when viewed in cross-section.

5. The track bar for a vehicle of claim 1, wherein the second end is a different size and mass than the first end.

6. The track bar for a vehicle of claim 1, wherein the vibration absorbing member is bonded to the first and second tubular members.

7. The track bar for a vehicle of claim 6, wherein the vibration absorbing member is heat bonded to the first and second tubular members.

8. A vehicle comprising:
   a track bar having a first end connected to a rear axle of the vehicle and a second end connected to a body location of the vehicle, the track bar including:

a first tubular member;

a second tubular member surrounding the first tubular member; and a viscoelastic member sandwiched between the first tubular member and the second tubular member, wherein the first and second tubular members and the viscoelastic member sandwiched therebetween extend across the rear of the vehicle between the first and second ends;

a first metallic C-channel; and a second metallic C-channel, wherein only respective ends of the first C-channel are joined by a weld to a top longitudinally central top portion of the second tubular member such that a portion of the first C-channel between its ends is spaced apart from the top portion, and only respective ends of the second C-channel are joined by a weld to a longitudinally central bottom portion of the second tubular member such that a portion of the second C-channel between its ends is spaced apart from the bottom portion, and wherein the longitudinally central to and bottom portions are spaced apart from each other.

9. The vehicle of claim 8, wherein the second end is more massive than the first end.

* * * * *